United States Patent [19]
Firth, Jr.

[11] 3,895,045
[45] July 15, 1975

[54] BIS-PHENOL SULFATE ESTERS
[75] Inventor: William Charles Firth, Jr., Wilton, Conn.
[73] Assignee: American Cyanamid Company, Stamford, Conn.
[22] Filed: Feb. 15, 1973
[21] Appl. No.: 332,981

Related U.S. Application Data
[62] Division of Ser. No. 153,862, June 16, 1971, abandoned.

[52] U.S. Cl............ 260/457; 260/47 C; 260/47 ET; 260/49; 260/543 R
[51] Int. Cl.² .................................. C07C 141/14
[58] Field of Search......... 260/457, 49, 47 C, 47 ET

[56] References Cited
UNITED STATES PATENTS
3,236,808  2/1966  Goldberg et al. .................. 260/49
3,401,148  9/1968  Schlott et al. ..................... 260/49
3,658,757  4/1972  Conix et al. ....................... 260/49
3,733,304  5/1973  Firth .................................. 260/49

OTHER PUBLICATIONS
Gilbert, "Sulfonation and Related Reactions," p. 374, (1965).

Primary Examiner—Howard T. Mars
Assistant Examiner—Norman Morgenstern
Attorney, Agent, or Firm—Frank M. Van Riet

[57] ABSTRACT
A method for the production of compounds having the formula $$Cl-SO_3-A-SO_3-Cl$$

wherein A is an aromatic radical, dihydroxy aromatic sulfate esters produced from said compounds, methods for the production of said esters and polymers produced therefrom, are disclosed.

6 Claims, No Drawings

3,895,045

BIS-PHENOL SULFATE ESTERS

CROSS-REFERENCE TO RELATED APPLICATIONS

This application is a divisional of my abandoned application Ser. No. 153,862 filed June 16, 1971, entitled SYNTHESIS OF MONOMERS AND POLYMERS.

BACKGROUND OF THE INVENTION

The production of various polymers having sulfur linkages in the backbone thereof are known in the art. For example, polysulfonates produced from diphenols and disulfonyl halides are disclosed and claimed in U.S. Pat. No. 3,236,808. Sulfonate-carboxylate copolymers are set forth in U.S. Pat. No. 3,262,914, while U.S. Pat. No. 3,228,912 teaches the production of polysulfonates by reacting a vinyl sulfonic acid ester of an organic polyol with an organic nitrogen compound containing amino, amido or imino groups. Additionally, U.S. Pat. No. 3,401,148 is directed to the production of sulfur-containing polyesters by reacting a diphenol with a diacid chloride in an inert organic solvent and in the presence of an aliphatic tertiary amine.

SUMMARY

I have now discovered a unique class of dihydroxy aromatic sulfate esters which are useful for a multiplicity of applications. The esters are useful as intermediates in the production of polymers, themselves useful in film forming, as molded objects, as fibers and the like. The sulfate esters also find utility as additives by blending them via known procedures with other materials such as vinyl polymers, alkyd resins, aminoplast resins and the like.

DESCRIPTION OF THE INVENTION INCLUDING PREFERRED EMBODIMENTS

The novel method of production of the above-mentioned bischlorosulfates comprises reacting an aromatic dihydroxy compound with sulfuryl chloride according to the equation

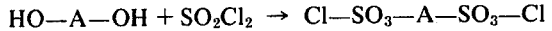

$$HO-A-OH + SO_2Cl_2 \rightarrow Cl-SO_3-A-SO_3-Cl$$

wherein A is an aromatic radical.

The reaction may be conducted at a temperature of from about 0°C. to about −80°C., preferably about −5°C. to about −65°C. The temperature of the reaction is unexpectedly critical in determining the extent of chlorination in a side reaction. For example, the reaction of sulfuryl chloride with 2,2-bis(4-hydroxyphenyl)propane at −5°C. to −10°C. leads to a low yield of the bischlorosulfate still containing excess chlorine after three recrystallizations. At a reaction temperature of −64° the bischlorosulfate was obtained in good yield with the theoretical chlorine content after one recrystallization. Reaction temperatures higher than −64° and an excess of sulfuryl chloride to compensate for that consumed by chlorination can be used to prepare high yields of chlorinated bischlorosulfates, as shown in Example 3. Usually a 2:1 molar ratio of sulfuryl chloride to the dihydroxyaromatic compound or a slight excess of the chloride is used. Atmospheric pressure is preferably employed, but subatmospheric or superatmospheric pressure may be used if necessary or desired.

The reaction is preferably conducted in the presence of a solvent which acts as an acid acceptor with such materials as tertiary amines, i.e. pyridine, triethyl amine, methyl pyridine and the like being exemplary and an inert solvent such as methylene chloride, ethyl ether, or ethyl acetate to moderate the exothermic reaction.

Although a solvent is not necessary in the production of the bischlorosulfates, such solvents as ethyl ether, ethyl acetate, methylene chloride and the like may be utilized.

Examples of materials which may be reacted with sulfuryl chloride according to the above equation include 2,2-bis-(4-hydroxyphenyl)-propane (Bisphenol-A); bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(2-chloro-4-hydroxyphenyl)-ethane; 1,1-bis-(2,5-dimethyl-4-hydroxyphenyl)-ethane; 2,2-bis-(4-hydroxynaphthyl)-propane; 2,2-bis-(4-hydroxyphenyl)-pentane; 2,2-bis-(4-hydroxyphenyl)-hexane; bis-(4-hydroxyphenyl)-phenylmethane; bis-(4-hydroxyphenyl)-cyclohexylmethane; 1,2-bis-(4-hydroxyphenyl)-1,2-bis-(phenyl)-ethane; 2,2-bis-(4-hydroxyphenyl)-1-phenylpropane; bis-(4-hydroxy-5-nitrophenyl)-methane; bis-(4-hydroxy-2,6-dimethyl-3-methoxyphenyl)-methane; 2,2-bis-(2,6-dichloro-4-hydroxyphenyl)-propane; 2,2-bis-(2-bromo-4-hydroxyphenyl)-propane, tetrabromobisphenol A and the like.

The preparation of these and other applicable compounds is known in the art. They are most commonly prepared by condensation of two moles of a phenol with a single mole of a ketone or aldehyde under known reaction conditions.

Also useful as charge materials in my novel process are the dihydroxybenzenes typified by hydroquinone and resorcinol; the dihydroxybiphenyls such as 4,4'-dihydroxybiphenyl; 2,2'-dihydroxybiphenyl; 2,4'-dihydroxybiphenyl and the dihydroxynaphthalenes such as 2,6-dihydroxynaphthalene, etc.

Dihydroxyaryl sulfones are also useful as charge materials. Sulfones such as bis-(4-hydroxyphenyl)-sulfone; 2,4'-dihydroxyphenyl sulfone; 2,4'-dihydroxy-5'-chlorophenyl sulfone; 3'-chloro-4,4'-dihydroxyphenyl sulfone; bis-(4-hydroxyphenyl)-biphenyl disulfone, etc. being exemplary. The preparation of these and other useful dihydroxyarylsulfones is described in U.S. Pat. No. 2,288,282 to Huissmann. Polysulfones, as well as sulfones substituted with halogen, nitro, alkyl and other substituents are also useful. In addition, related sulfides and sulfoxides are applicable.

Dihydroxyaromatic ethers are also useful and may be prepared by methods found in Pat. No. 2,739,171 to Linn, and in "Chemical Reviews", 38, 414-417 (1946). Typical of such dihydroxyaryl ethers which may be reacted with sulfuryl chloride according to my novel method are the following: 4,4'-dihydroxyphenyl ether; 4,4'-dihydroxy-2,6-dimethylphenyl ether; 4,4'-dihydroxy-3,3'-diisobutylphenyl ether; 4,4'-dihydroxy-3,3'-diisopropylphenyl ether; 4,4'-dihydroxy-3,2'-dinitrophenyl ether; 4,4'-dihydroxy-3,3'-dichlorophenyl ether; 4,4'-dihydroxynaphthyl ether; 4,4'-dihydroxy-2,6-dimethoxyphenyl ether and the like. The many other types of suitable dihydroxyaryl compounds will be apparent to those skilled in the art.

The bischlorosulfate monomers produced according to my novel process are generally white solids which melt without decomposition. They appear to be more stable to moisture than most other acid chlorides.

The bischlorosulfate of 2,2-bis-(4-hydroxyphenyl)propane has two solid modifications, which have slightly different melting points and infrared spectra. One modification (A in Table I) has a melting point of 79.5° – 82.5° and a distinctive infrared band at 821 cm$^{-1}$. The other modification (B) has a melting point of 72.5° – 75.0° and a characteristic infrared band at 803 cm$^{-1}$. Both modifications gave the same theoretical analysis for carbon, hydrogen, sulfur and chlorine. Mixtures of the two modifications can be prepared. Polymorphism of this type is, of course, known in a great many organic compounds (R. S. Tipson, in *Technique of Organic Chemistry*, A. Weissberger, Ed., Interscience Publishers Inc., New York, N.Y., 1950, pp. 391–393).

The novel aromatic sulfate esters of the instant invention have the formula (I)  HO—A$+$OSO$_2$O—A$)_m$ OH wherein A in each instance is the same or a different aromatic radical and $m$ is an integer of 1–2, inclusive. Because of a side reaction, discussed in more detail below, the sulfate esters contain 1–5 percent chlorine.

The sulfate esters of Formula I are produced according to the equation (A)

HO—A—OH + Cl—SO$_3$—A—SO$_3$—CL → HO—A$+$OSO$_2$O—A$)_m$ OH + 2XCl wherein A and $m$ are as defined above.

The products are amber, low-melting brittle solids. Elemental analysis shows the presence of chlorine, while infrared spectroscopy and nuclear magnetic resonance spectroscopy show the presence of hydroxyl groups.

The reaction is carried out via Equation A, generally with a molar ratio of phenol to chloride of 1:1 to 2:1, respectively. The use of the 2:1 ratio gives esters containing less chlorine and less sulfate than the 1:1 ratio. If desired, even more of the phenol can be used.

Reactions of aromatic bischlorosulfates with dihydroxyaromatic compounds in a 1:1 molar ratio were initially intended to produce aromatic polysulfates, such as those described in my copending application, Ser. No. 130,528, filed Apr. 1, 1971, entitled SYNTHESIS OF MONOMERS AND POLYMERS now U.S. Pat. No. 3,733,304. Because of the surprising side reactions which result in chlorination and the generation of hydroxyl groups, the products contain at most only about two sulfate groups. (This is, of course, the average composition of the mixture of compounds in the product.) The chlorination is believed to take place on the aromatic rings, but this concept is not to be construed as a limitation of the instant invention.

The reactions are allowed to proceed for about 2–7 hours, i.e. until essentially complete conversion is achieved, although longer or shorter reaction times may be used.

Temperatures ranging from about 25°C. to about 150°C. may be used, preferably 75°–125°C. Atmospheric pressure is preferred, but subatmospheric or superatmospheric pressure can be used.

The reactions are conducted in the presence of an acid acceptor such as pyridine.

The aromatic sulfate esters (I) contain hydroxyl end groups which permit them to be extended with difunctional compounds such as bischloroformates, diisocyanates, dibasic acids or esters, etc. to produce mixed poly(sulfate/carbonates), poly(sulfate/urethanes), poly(sulfate/esters) and the like.

For example, utilizing phosgene as the carbonate forming reactant, high molecular weight poly(sulfate/carbonates) are produced according to the equation HO—A$+$OSO$_2$O—A$)_m$ OH + COCl$_2$ →
$+$O—A$+$OSO$_2$O—A$)_m$ OCO$)_x$ wherein A and m are as indicated above and x represents the number of recurring units in the polymer.

In order to obtain high molecular weights in these extension reactions, small amounts of unchanged chlorosulfate groups must sometimes be removed by a preliminary hydrolysis step. This step is not always necessary, but depends on the time and temperature used in the preparation of the dihydroxyaromatic sulfate esters and the molecular weight sought in the extension reaction.

The poly(sulfate/carbonates) are a versatile and useful class of polymers. The combination of high softening temperature, desirable strength characteristics and thermal and chemical stability make these compositions useful as thermoplastic molding compounds for the fabrication of molded gaskets, tubing, gears etc. either alone or combined with such fillers as silica, carbon black, wood flour etc. Films thereof are useful as packaging material, containers, covers, liners, insulation, recording tapes, photographic film base, pipe wrappings etc. They may be oriented or drawn at suitable temperatures to permit enhancement of strength properties such as tensile and flexural strengths and may be amorphous or crystalline. Fibers may also be readily formed by melt or solution spinning and are useful as yarn, thread, bristle, rope and the like. The polymers of this invention may be readily pigmented or dyed, suitable stabilizers and plasticizers as are known in the art may be incorporated therein and alloying with other resinous materials may be accomplished. The present compositions may also be used as surface coatings in paints, varnishes and enamels and their powerful adhesive qualities render them particularly useful as adhesives for plastic, rubber, metal, glass or wood parts.

The following examples are set forth for purposes of illustration only and are not to be construed as limitations on the present invention except as set forth in the appended claims. All parts and percentages are by weight unless otherwise specified.

EXAMPLE 1

A suitable reaction vessel equipped with a stirrer, low temperature thermometer and graduated addition funnel protected with a drying tube, is charged with a solution of 2,2-bis-(4-hydroxyphenyl)propane (114.2 parts) and pyridine (87 parts) in 503 parts of methylene chloride, stirred and cooled with a dry ice-acetone bath to −64°. A solution of 143 parts of sulfuryl chloride, as a 4.40 molar solution in methylene chloride, is added slowly from the addition funnel.

The cold bath is then removed. Stirring is continued while the temperature of the reaction mixture is raised to 0°. A solution of 200 parts of water and 24 parts of concentrated hydrochloric acid is then added. The resultant methylene chloride layer is extracted twice with aqueous hydrochloric acid, thrice with water and dried in two stages with anhydrous sodium sulfate. The methylene chloride is removed under vacuum to give 207 parts of white solid bischlorosulfate,

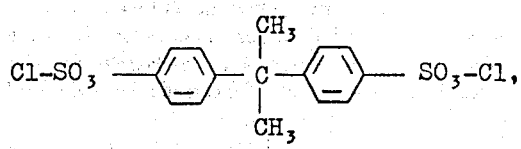

m.p. 70.5° – 74.5°C., 17.4% Cl, 803 cm$^{-1}$ absorption.

The product is recrystallized from hexane at −25° with exclusion of moisture to give 178 parts of isopropylidene-di-p-phenylene chlorosulfate; m.p. 72.5° – 75.0°C.

Anal. Calcd. for $C_{15}H_{14}Cl_2O_6S_2$: C, 42.36; H, 3.32; Cl, 16.67; S, 15.08. Found: C, 42.41; H, 3.40; Cl, 16.76; S, 15.03.

The infrared spectrum shows a weak peak at 803 cm$^{-1}$ which is characteristic of the solid modification B.

EXAMPLES 2–5

Following the procedure of Example 1, various runs are conducted varying the reaction temperature and the molar ratio of reactants. In these runs the methylene chloride layer is extracted several times with a mixture of dilute sodium hydroxide solution and ice just before being dried with anhydrous sodium sulfate. The results are set forth in Table I, below. In Example 5 the infrared spectrum showed a weak peak at 821 cm$^{-1}$, which is characteristic of solid modification A.

Found: C, 42.31; H, 3.32; Cl, 16.82; S, 15.11

is recovered.

EXAMPLE 9

2,2-Bis(3,5-dibromo-4-hydroxyphenyl)-propane (54.4 parts), pyridine (16 parts) and sulfuryl chloride (27 parts) are combined as in Example 1. The product is isolated in the usual way. After recrystallization white solid

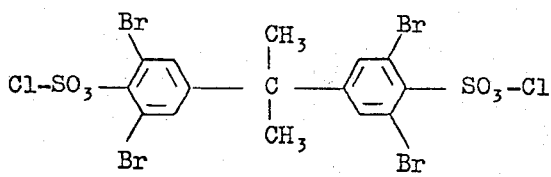

is obtained.

EXAMPLE 10

Hydroquinone (22.0 parts), pyridine (32 parts) and sulfuryl chloride (54 parts) are allowed to react in methylene chloride solution as in Example 1. Recrystallization of the isolated product gives

in good yield.

TABLE I

Preparation of the Bischlorosulfate of 2,2-Bis(4-hydroxyphenyl)propane

| Ex. | Bisphenol A parts | Sulfuryl Chloride parts | Pyridine parts | Reaction Temp., 20°C. | Crude Product parts | % Cl[a] | Purified Bischlorosulfate No. of recryst.[b] | Yield parts | mp | % Cl[a] | Solid Modification |
|---|---|---|---|---|---|---|---|---|---|---|---|
| 1 | 114.2 | 143 | 87 | −64 | 207.4 | 17.44 | 1 | 178 | 72.5–75 | 16.76 | B |
| 2 | 45.6 | 54.4 | 32 | −5 to −10° | 46.9 | — | 3 | 12.5 | 74–78.5 | 17.49 | A |
| 3 | 91.2 | 162.4 | 97 | −24 to −28° | 166.4 | — | 1 | 131 | 65.5–68.5 | 18.77 | B |
|   |       |       |    |            |       |   | 2 | 107 | 67.5–70.5 | 18.17 | B |
| 4 | 91.2 | 119 | 97 | −50 | 155 | 17.3 | 1 | 120 | 67.5–71.5 | 17.89 | B |
| 5 | 114.2 | 135.0 | 79 | −64 | 140 | 16.85 | 1 | 111 | 79.5–82.5 | 16.82 | A |

[a]The theoretical chlorine content of the crude bischlorosulfate is 16.67%.
[b]Recrystallized from n-hexane at −13 to −25°.

EXAMPLE 6

The procedure of Example 1 is again followed except that ethyl ether is substituted for the methylene chloride solvent thereof. Similar results are achieved.

EXAMPLE 7

The use of ethyl acetate as a solvent for the methylene chloride of Example 1, all else remaining equal, gives similar results.

EXAMPLE 8 p,p'-Biphenol (18.6 parts), pyridine (16 parts) and sulfuryl chloride (27 parts) are allowed to react in methylene chloride solution as in Example 1. The product is recrystallized and an excellent yield of white solid,

EXAMPLE 11

4,4'-Dihydroxydiphenyl sulfone (95% — 4,4' isomer, 25.0 parts), pyridine (16 parts) and sulfuryl chloride (27 parts) are allowed to react in methylene chloride solution as in Example 1. After isolation the crude product is recrystallized and

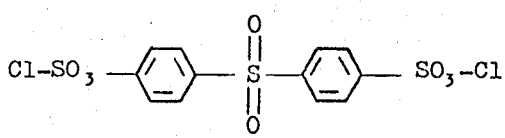

is recovered.

EXAMPLES 12–18

(Production of Esters)

These reactions are carried out under nitrogen and with the exclusion of moisture. The experimental details are summarized in Table II. The products are dissolved in methylene chloride and extracted with cold dilute hydrochloric acid and then with water until the aqueous layer is neutral. The methylene chloride solutions are dried with sodium sulfate, and the products isolated by removal of the methylene chloride under vacuum.

The product is added to vigorously stirred water to precipitate the polymer. The polymer is isolated, washed with water, stirred for 10 minutes with hot water (ca. 80°), collected by filtration, washed with water, and dried under vacuum at 80°C. The polymer is reprecipitated from methylene chloride solution with methanol and dried under vacuum at 80°. Elemental analyses and viscosities of the polymers are shown in Table III. The polymer of Example 19 is derived from the ester of Example 12 etc.

Physical properties of compression-molded samples of the polysulfate polycarbonate from Example 25 are given in Table IV.

TABLE II

| Example | Bisphenol A parts | Bischlorosulfate parts | % Cl[a] | Pyridine parts | Conditions hr | °C. | Product parts |
|---|---|---|---|---|---|---|---|
| | | 1:1 REACTANT MOLE RATIO | | | | | |
| 12 | 1.07 | 1.99 | 17.22 | 1.5 | 4 | 120 | 1.9 |
| 13 | 2.24 | 4.17 | 17.49 | 3.2 | 2[b]= | 120 | 4.7 |
| 14 | 2.09 | 3.89 | 16.76 | 2.9 | 2 | 100 | 4.6 |
| | | 2:1 REACTANT MOLE RATIO | | | | | |
| 15 | 2.19 | 2.04 | 17.22 | 1.5 | 2 | 100 | 3.0 |
| 16 | 3.26 | 3.03 | 17.49 | 2.3 | 2** | 120 | 4.8 |
| 17 | 3.06 | 2.8 | 17.49 | 2.2 | 2 | 80 | 4.5 |
| 18 | 171.7 | 160.0 | 18.16 | 119 | 2[c] | 100 | 289 |

[a]Theoretical chlorine content: 16.67%
[b]Used shaking
[c]Used stirring
*4 hours at 80°C.; 1 hour at 100°C.; 2 hours at 120°C.
**2 hours at 80°C.; 1 hour at 100°C.; 2 hours at 120°C.

TABLE III

| Example | NaOH Treatment | Derived polysulfate polycarbonate | | | | | | |
|---|---|---|---|---|---|---|---|---|
| | | % C | % H | % S | % Cl | $SO_4$:$CO_3$ | Cl:S | $\eta$inh[a] |
| 19 | No | 62.77 | 4.71 | 7.38 | 4.87 | 1.9 | 0.60 | 0.20 |
| 20 | Yes | 62.50 | 4.63 | 7.20 | 4.86 | 1.9 | 0.61 | 0.26 |
| 21 | Yes | 64.94 | 4.76 | 6.18 | 4.20 | 1.3 | 0.61 | 0.40 |
| 22 | No | 66.80 | 5.05 | 6.74 | 1.50 | 1.4 | 0.20 | 0.28 |
| 23 | No | 66.23 | 5.11 | 6.62 | 1.66 | 1.4 | 0.23 | 0.50 |
| 24 | Yes | 67.24 | 5.27 | 5.92 | 1.38 | 1.1 | 0.21 | 0.64 |
| 25 | Yes | 65.90 | 5.08 | 6.30 | 2.46 | 1.3 | 0.35 | 0.54 |

[a]Determined on benzene solutions at 30°, 0.5% concentration

EXAMPLES 19–25

Some of the crude products of Examples 12–18 are treated with aqueous sodium hydroxide to hydrolyze small amounts of unchanged chlorosulfate groups, which otherwise would limit the molecular weight of the polysulfate polycarbonate.

Typically the crude product is heated at reflux for one hour with 0.5 N sodium hydroxide solution (30 parts/part). The product is acidified with cold, dilute hydrochloric acid (10 parts concentrated hydrochloric acid—90 parts water—100 parts ice per 100 parts of sodium hydroxide solution) and extracted with methylene chloride. The methylene chloride solution is extracted with water until the extracts are neutral and then dried with sodium sulfate. The product is recovered by removing the methylene chloride under vacuum.

The esters are dissolved in reagent grade pyridine and stirred vigorously while phosgene is slowly bubbled in. The end point is indicated by a viscosity increase.

TABLE IV

Properties of Molded Poly(sulfate/carbonate) (of Example 25)

| | |
|---|---|
| Transparency | transparent |
| X-ray pattern | amorphous |
| Flexural strength, psi | 17,500 |
| Flexural modulus, psi | 404,000 |
| Tensile strength, psi | 9,800 |
| Izod impact strength (ft. lb./in. notch, ⅛" bar) | 0.6 |
| Rockwell Hardness, "M" scale | 72 |
| Glass transition temperature (by differential thermal analysis) | 107°C. |

EXAMPLES 26–27

These reactions are also carried out under nitrogen with the exclusion of moisture. The reaction mixtures are heated for 2 hours at 100°C. The products are isolated, treated with sodium hydroxide solution, and converted to polysulfate polycarbonates as indicated above. The dihydroxy compounds reacted with the bischlorosulfate of Bisphenol A and other conditions therefor, are disclosed in Table V.

Properties of the sulfate/carbonate polymers are shown in Table VI.

TABLE V

| Example | Dihydroxy Compound, parts | | Bischlorosulfate of Bisphenol A<sup>a</sup>, parts | Pyridine parts | Product parts |
|---|---|---|---|---|---|
| 26 | p,p'-biphenol | 1.79 | 4.08 | 3.0 | 4.0 |
| 27 | 4,4'-oxydiphenol | 1.85 | 3.89 | 2.9 | 3.2 |

<sup>a</sup>The bischlorosulfate contained 16.76% chlorine; theoretical chlorine content: 16.67%.

TABLE VI

Properties of Poly(sulfate/carbonates) of Examples 26 and 27

| | Derived polysulfate/carbonate | | | | | |
|---|---|---|---|---|---|---|
| Example | %C | %H | %S | %Cl | Cl:S | ηinh<sup>a</sup> |
| 26 | 61.53 | 3.95 | 7.78 | 4.66 | 0.54 | 0.37 |
| 27 | 59.92 | 4.32 | 7.74 | 4.11 | 0.48 | 0.19 |

<sup>a</sup>Determined in methylene chloride at 30°C., 0.5% concentration.

I claim:

1. A dihydroxyaromatic sulfate ester having the formula

HO—A—(OSO₂O-A—)ₘOH wherein A in each instance is the same or a different and is a radical defined by abstraction of the hydroxy groups from a compound selected from the group consisting of
1. 2,2-bis-(4-hydroxyphenyl)-propane;
2. bis-(2-hydroxyphenyl)-methane;
3. bis-(4-hydroxyphenyl)-methane;
4. 1,1-bis-(4-hydroxyphenyl)-ethane;
5. 1,2-bis-(4-hydroxyphenyl)-ethane;
6. 1,1-bis-(2-chloro-4-hydroxyphenyl)-ethane;
7. 1,1-bis-(2,5-dimethyl-4-dihydroxyphenyl)-ethane;
8. 2,2-bis-(4-hydroxynaphthyl)-propane;
9. 2,2-bis-(4-hydroxyphenyl)-pentane;
10. 2,2-bis-(4-hydroxyphenyl)-hexane;
11. bis-(4-hydroxyphenyl)-phenylmethane;
12. bis-(4-hydroxyphenyl)-cyclohexylmethane;
13. 1,2-bis-(4-hydroxyphenyl)-1,2-bis-(phenyl)-ethane;
14. 2,2-bis-(4-hydroxyphenyl)-1-phenylpropane;
15. bis-(4-hydroxy-5-nitrophenyl)-methane;
16. bis-(4-hydroxy-2,6-dimethyl-3-methoxyphenyl)-methane;
17. 2,2-bis-(2,6-dichloro-4-hydroxyphenyl)-propane;
18. 2,2-bis-(2-bromo-4-hydroxyphenyl)-propane;
19. tetrabromobisphenol A;
20. dihydroxybenzenes;
21. dihydroxybiphenyls;
22. dihydroxynaphthalenes;
23. dihydroxyaryl sulfones;
24. dihydroxyaryl sulfones further substituted with halogen or nitro groups;
25. dihydroxyaryl ethers;
26. 4,4'-dihydroxy-3,2'-dinitrophenyl ether;
27. 4,4'-dihydroxy-3,3'-dichlorophenyl ether; and
28. 4,4'-dihydroxy-2,6-dimethoxyphenyl ether and m is a whole, positive integer of 1,2, inclusive.

2. An ester according to claim 1 wherein A is

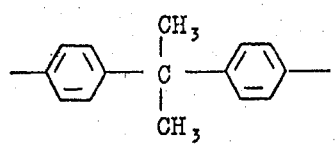

3. An ester according to claim 1 wherein A is

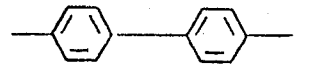

4. An ester according to claim 1 wherein one A is

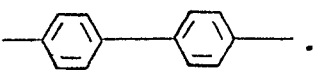

and the other A is

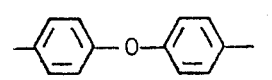

5. An ester according to claim 1 wherein one A is

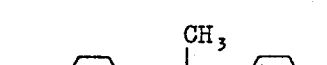

and the other A is

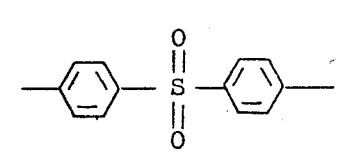

6. An ester according to claim 1 wherein A is

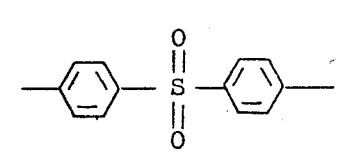

* * * * *